United States Patent [19]
Brent et al.

[11] Patent Number: 5,753,316
[45] Date of Patent: May 19, 1998

[54] TREATMENT OF METAL PARTS TO PROVIDE IMPROVED SEALCOAT COATINGS

[75] Inventors: Randall J. Brent, North Royalton; Robert D. Anthony, Berea, both of Ohio

[73] Assignee: PPG Industries, Inc., Pittsburgh, Pa.

[21] Appl. No.: 782,972

[22] Filed: Jan. 14, 1997

[51] Int. Cl.⁶ ..................................................... B05D 7/14
[52] U.S. Cl. .................... 427/486; 427/379; 427/388.1; 427/409; 427/410
[58] Field of Search .................... 106/14.41, 14.42, 106/14.44, 36, 14.14, 14.15, 14.16, 14.17, 14.21; 523/149; 427/388.1, 379, 409, 410, 486

[56] References Cited

U.S. PATENT DOCUMENTS

| | | | |
|---|---|---|---|
| Re. 27,896 | 1/1974 | Rausch et al. | 204/181 |
| 3,110,691 | 11/1963 | Fisher, Jr. | 260/22 |
| 3,118,048 | 1/1964 | Fisher, Jr. et al. | 219/92 |
| 3,372,038 | 3/1968 | Weldes et al. | 106/1 |
| 3,454,483 | 7/1969 | Freeman | 204/181 |
| 3,469,071 | 9/1969 | Feldt et al. | 219/137 |
| 3,620,949 | 11/1971 | Morrison et al. | 204/181 |
| 3,671,331 | 6/1972 | Malkin et al. | 148/6.2 |
| 3,687,738 | 8/1972 | Malkin | 148/6.2 |
| 3,687,739 | 8/1972 | Kennedy et al. | 148/6.2 |
| 3,849,141 | 11/1974 | Palm et al. | 106/1 |
| 3,864,230 | 2/1975 | Springer et al. | 204/181 |
| 4,007,102 | 2/1977 | Springer et al. | 204/181 |
| 4,165,242 | 8/1979 | Kelly et al. | 148/6.15 Z |
| 4,175,018 | 11/1979 | Gacesa | 204/181 |
| 4,375,498 | 3/1983 | Le Minez et al. | 428/416 |
| 4,647,309 | 3/1987 | Hayner | 106/14.13 |
| 4,650,526 | 3/1987 | Claffey et al. | 148/6.14 R |
| 4,799,959 | 1/1989 | Fourez et al. | 106/1.16 |
| 5,385,655 | 1/1995 | Brent et al. | 204/181.1 |

*Primary Examiner*—Erma Cameron
*Attorney, Agent, or Firm*—Kenneth J. Stachel

[57] ABSTRACT

In one embodiment, the present invention relates to a method of treating metal surfaces including the steps: coating the metal surface with a film-forming sealcoat containing at least one organic resin and at least one torque modifier, with the proviso that if the metal surface is a phosphated metal surface, then no other film of a siccative organic coating other than the film-forming sealcoat is applied; and curing the film-forming sealcoat.

20 Claims, No Drawings

TREATMENT OF METAL PARTS TO PROVIDE IMPROVED SEALCOAT COATINGS

TECHNICAL FIELD

This invention relates to an improved metal treatment process and to particularly defined metal surfaces thus treated. More specifically, the invention relates to the sealcoating of particularly defined metal substrates, especially metal articles such as nuts, bolts, etc., to improve the driveability, torque properties and corrosion resistance of such substrates.

BACKGROUND OF THE INVENTION

Coating compositions have been applied to metal surfaces such as by spraying, dipping, rolling, centrifuged dipspinning, etc. The coating compositions include water based and oil based coatings such as paints, lacquers, synthetic resins, and inorganic coatings such as phosphate containing coatings, zinc containing coatings and other metal based coatings. Various properties of the coated metal surfaces are either created or improved by the coating compositions.

Water-based coatings have been employed to process metal parts including small stamped parts such as nuts, bolts, and fasteners. The use of electrodeposition of siccative organic coatings on small parts deposits a film of uniform thickness on essentially any conductive surface, even those which have sharp points and edges. The use of water-base coating compositions also is advantageous since they contain little or no organic solvents or other volatile organic compounds. Accordingly, such aqueous systems and processes do not require special precautions or equipment for handling any harmful volatile materials, and such aqueous systems and processes do not contribute to the problem of volatile organic emissions and air pollution.

It also is well known in the metal-finishing art that metal surfaces such as aluminum, ferrous and zinc surfaces may be provided with an inorganic phosphate coating by contacting the surfaces with an aqueous phosphating solution. The phosphate coating protects the metal surface to a limited extent against corrosion and serves primarily as a base for the later application of a siccative organic coating composition such as paint, lacquer, varnish, primer, synthetic resin, enamel, and the like. Procedures also have been described in the art for improving the rust-resistance of metal articles by the application of a film of paint over phosphated surfaces. Although the application of a siccative coating over a phosphated metal surface improves the corrosion resistance properties of the metal, there continues to be a need to improve the driveability, torque properties and corrosion resistance of metal surfaces, especially with a material that is dry to the touch.

One solution proposed includes applying a layer of oil, such as mineral oil, to a treated or untreated metal article. While the oil layer, in some instances, may improve driveability, torque properties or corrosion resistance, it has various disadvantages associated with its use. For example, oil coated metal articles which are not dry to the touch not only tend to absorb debris during storage, but they also may leave oil stains where they are stored. As a result, it is undesirable to handle oil coated metal articles. Another disadvantage is the inability to apply an oil layer of uniform thickness to all surfaces of a given metal article or to all metal articles being treated. Moreover, there remains a need to provide better driveability, torque properties and corrosion resistance to metal surfaces than that provided by an oil layer.

Procedures for improving the properties of metal articles by application of a film of paint over a phosphated surface have been described in a number of patents such as U.S. Pat. Nos. 3,454,483; 3,620,949; 3,864,230; 4,007,102; 4,165,242 and Re 27,896. As noted in U.S. Pat. No. Re 27,896, the electrophoretic application of paint and lacquer over a phosphated metal surface is not a complete solution to the rust problem. It has been found that when paint is electrodeposited on phosphate coated ferrous metal surfaces, the resulting paint films have often been found to contain numerous small depressions or pin holes. Such films generally provide only a slight corrosion protective action, probably due to the presence of a lower film thickness in the depressions. In an attempt to overcome this problem, paints and lacquers have been used containing synthetic resin components which form films which during a subsequent baking will soften so that the surface blends smoothly and the depressions and pin holes are filled with resin. One difficulty with this technique, however, is that there often is a withdrawal of the paint film from the edges of the workpiece being treated so that these portions are then subjected to additional corrosion attacks. In U.S. Pat. No. Re 27,896, a solution to this problem is proposed which involves the incorporation of cupric ions into the zinc phosphate coating applied to the article prior to painting. In U.S. Pat. No. 3,454,483, an improvement in the corrosion resistance of electrophoretically painted metal surfaces is proposed when the phosphate coating used as a primer for the paint contains fluoride ions.

U.S. Pat. No. 4,165,242 relates to a method for treating metal parts either singly or in bulk barrel processing to provide durable and rust-inhibiting coatings which involves the steps of treating the metal parts with an aqueous phosphating solution to deposit a phosphate coating thereon, electrophoretically depositing a siccative organic coating on the phosphate coated metal parts, and treating the siccative organic coated part with an oil to deposit a corrosion-inhibiting top coat.

U.S. Pat. No. 4,650,526 relates to a method of treating phosphated metal surfaces by contacting the metal surfaces with an aqueous mixture of an aluminum-zirconium complex containing the reaction product of a chelated aluminum moiety, an organofunction ail ligand, and a zirconium oxyhalide. A rust inhibiting oil can optionally b)e applied as a seal coating.

SUMMARY OF THE INVENTION

In one embodiment, the present invention relates to a method of producing a torque modifying coating on a nori-phosphated metal surface including the steps: coating the non-phosphated metal surface with a film-forming sealcoat containing at least one organic resin and at least one torque modifier; and curing the film-forming sealcoat.

In another embodiment, the present invention relates to a method of treating metal surfaces including the steps: coating the metal surface with a film-forming sealcoat containing at least one organic resin and at least one torque modifier, with the proviso that if the metal surface is a phosphated metal surface, then no other film of a siccative organic coating other than the film-forming sealcoat is applied; and curing the film-forming sealcoat.

In yet another embodiment, the present invention relates to a method of treating a non-phosphated metal surface including the steps: applying a non-phosphate metal-containing coating to the non-phosphated metal surface; coating the non-phosphated metal surface having a non-phosphate metal-containing coating with a film-forming sealcoat containing at least one organic resin and at least one torque modifier; and curing the film-forming sealcoat.

In yet another embodiment, the present invention relates to supplementing certain embodiments above by including the steps: applying an additional organic film before or after coating with a film-forming sealcoat; and curing the additional organic film.

The processes of this invention leads to improvements in the driveability, torque properties and corrosion-inhibiting properties of treated or untreated metal surfaces.

DESCRIPTION OF THE PREFERRED EMBODIMENTS

The processes of this invention can be utilized to improve the driveability, torque properties and corrosion-inhibiting properties of treated or untreated metal surfaces of aluminum, brass, chrome, chromium, copper, iron, nickel, steel, tin, zinc, a variety of metal oxides and alloys thereof (including alloys containing only one of the aforementioned metals in combination with other metals or metal oxides), and is useful particularly for bulk handling and treating small metal parts such as nuts, bolts and screws and subassemblies which otherwise are particularly difficult to provide driveability, torque properties and corrosion-inhibiting properties because of the difficulty of coating the more inaccessible areas of these parts such as the grooves between the threads, and the tendency of treated parts to nest together during treatment and curing. Although numerous alloys can be used, specific examples of preferred alloys of metal which can be treated in accordance with the present invention include aluminum-zinc, chrome zinc, aluminum-chrome-zinc and aluminum-zinc-metal oxides.

In the ordinary practice of treating a metal surface, the surface of the metal generally may be cleaned initially by physical and/or chemical means to remove any grease, dirt, or oxides, and then it is treated in accordance with the present invention. Cleaning solutions are known in the art and generally are aqueous solutions containing sodium hydroxide, sodium carbonate, an alkali metal silicate, alkali metal metaborate, water softeners, and surface active agents. Oxide removal is usually accomplished with mineral acid pickles such as sulfuric acid and hydrochloric acid.

Sealcoat

The compositions which are utilized to provide the sealcoat of the present invention contain a liquid carrier or vehicle (generally aqueous), a resin and a torque modifier. For purposes of this invention, resins include water emulsions, dispersions, or solutions based on water-dispersible, film-forming thermosetting and/or emulsifiable synthetic organic resins such as alkyd resins, acrylic polymers, melamine resin, epoxy resins, phenolic resins, polyester resins, polybutadiene resins, cyclized olefin resins, polyvinyl alcohol resins and natural resins. In one embodiment, the resin of the sealcoat coating composition is a siccative organic coating composition. These resins, which are preferably aqueous compositions, generally can have a pH of about 9 for anodic application and about pH 5 for cathodic paints, and the liquid carrier used is either water or an aqueous alcoholic mixture. The sealcoat compositions may be either paints or lacquers, i.e., they may be either pigmented or unpigmented. The sealcoat compositions generally contain highly polar resins and principally thermosetting resins.

Any water-dispersible and/or emulsifiable film-forming thermosetting resin can be utilized in the sealcoat compositions used in the present invention, provided that the sealcoat compositions containing such resins deposit an adherent coating on the treated or untreated metal surface. The resins which have been found to be particularly useful in the sealcoat compositions of the present invention are thermosetting resins such as urethanes, amino resins, acrylic resins, alkyd resins, epoxy resins, phenolic resins, cyclized olefin rubbers, halogenated polyolefins, halo-sulfonated polyolefins, polybutadiene rubbers, natural resins, and mixtures thereof. Particularly useful are the epoxy resins and mixtures of epoxy resins and amino resins, (e.g., melamine resins). The amount of resin included in the sealcoat compositions used in the process of this invention may range from about 3 to about 40% by weight. In one preferred embodiment, the sealcoat composition contains from about 5 to about 25% by weight of resin.

Thermosetting epoxy resins are particularly useful in the sealcoat compositions of the present invention and they include any of a number of well-known organic resins which are characterized by the presence therein of a terminal epoxide group shown below.

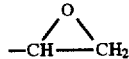

A wide variety of such resins are available commercially. Such resins have either a mixed aliphatic-aromatic or an exclusively non-benzeneoid (i.e., aliphatic or cycloaliphatic) molecular structure. Monofunctional epoxy resins and polyfunctional epoxy resins, such as difunctional, trifunctional and tetrafunctional epoxy resins, may be used.

The mixed aliphatic-aromatic epoxy resins which are useful with the present invention are prepared by the well-known reaction of a bis(hydroxy-aromatic) alkane, such as 2,2-bis-(p-hydroxyphenyl)-propane, or a tetrakis-(hydroxyaromatic)-alkane with a halogen-substituted aliphatic epoxide, such as epichlorohydrin, in the presence of a base such as, e.g., sodium hydroxide or potassium hydroxide. Under these conditions, hydrogen halide is first eliminated and the aliphatic epoxide group is coupled to the aromatic nucleus via an ether linkage. Then the epoxide groups condense with the hydroxyl groups to form polymeric molecules, which vary in size according to the relative proportions of reactants and the reaction time.

In lieu of the epichlorohydrin, one can use halogen-substituted aliphatic epoxides containing about 4 or more carbon atoms, generally about 4 to about 20 carbon atoms. In general, it is preferred to use a chlorine-substituted terminal alkylene oxide (terminal denoting the epoxide group is on the end of the alkyl chain) and a particular preference is expressed for epichlorohydrin by reason of its commercial availability and excellence in forming epoxy resins useful for the purpose of this invention.

If desired, the halogen-substituted aliphatic epoxide may also contain substituents such as, e.g., hydroxy keto, nitro, nitroso, ether, sulfide, carboalkoxy, etc. Monofunctional and multifunctional epoxy resins may be used, and multifunctional epoxy resins, such as, difunctional, trifunctional and tetrafunctional epoxy resins, are preferred.

Similarly, in lieu of the 2,2-bis-(p-hydroxyphenyl)-propane, one can use bis-(hydroxyaromatic) alkanes containing about 16 or more carbon atoms, generally about 16 to about 30 carbon atoms such as, e.g., 2,2-bis-(1-hydroxy-4-naphthyl)-propane; 2,2-bis(o-hydroxyyphenyl)propane; 2,2-bis-(p-hydroxyphenyl)butane, 3,3-bis-(p- hydroxyphenyl)hexane; 2-(p-hydroxyphenyl)-4-(1-hydroxy-4-naphthyl)octane, 5-5-bis-(p-hydroxy-o-methylphenyl)-decane, bis-(p-hydroxyphenyl)methane, 2,2-bis-(p-hydroxy-o-isopropylphenyl)propane, 2,2-bis-(o,p-dihydroyphenyl)propane, 2-(p-hydroxyphenyl)-5-(o-hydroxyphenyl)hexadecane, and the like. If desired, the bis-(hydroxyaromatic)alkane may contain substituents such as, e.g., halogen, nitro, nitroso, ether, sulfide, carboalkoxy, etc. In general, it is preferred to use a bis-(p-hydroxyphenyl) alkane since compounds of this type are readily available from the well-known condensation of phenols with aliphatic ketones or aldehydes in the presence of a dehydrating agent such as sulfuric acid. Particularly preferred is 2,2-bis-(p-hydroxyphenyl)propane, which is available commercially as "Bisphenol A".

Epoxy resins of the type described above are available from a wide variety of commercial sources. One group is known by the general trade designation EPON resins and are available from Shell Chemical Co. For example, EPON 820 is an epoxy resin having an average molecular weight of about 380 and is prepared from 2,2-bis-(p-hydroxyphenyl) propane and epichlorohydrin. Similarly, EPON 1031 is an epoxy resin having an average molecular weight of about 616 and is prepare from epichlorohydrin and symmetrical tetrakis-(p-hydroxyphenyl)ethane. EPON 828 has a molecular weight of 350–400 and an epoxide equivalent of about 175–210.

Another group of commercially available epoxy resins are identified under the general trade designation EPI-REZ (Celanese Resins, a Division of Celanese Coatings Company). For example, EPI-REZ 510 and EPI-REZ 509 are commercial grades of the diglycidyl ether of Bisphenol A differing slightly in viscosity and epoxide equivalent.

Another group of epoxy resins are available from Furane Plastics Inc., Los Angeles, Calif. under the general trade designations EPIBOND and EPOCAST. For example, EPI-BOND 100A is a one component epoxy resin powder available from Furane which is curable to a hard resin in the absence of any hardener.

Liquid forms of epoxy resin are also useful. These liquid forms normally comprise very viscous liquids requiring some degree of heating to permit withdrawal from storage containers. Certain "D.E.R." resins obtainable from Dow Chemical Company and "EPOTUF" liquid epoxy resins obtainable from Reichhold Chemicals Inc. are examples of such resins preferred for employment in accordance with the invention. An example of an EPOTUF liquid epoxy resin in the undiluted medium high viscosity #37–140 having an epoxide equivalent weight of 180–195, a viscosity (ASTM D445) of 11,000–14,000 cps at 25° C., and a Gardner Color Maximum of 3. This is a standard general purpose epoxy resin.

In some embodiments of the invention the epoxy resins may be "solubilized" by neutralization with a basic compound such as an organic amine. Examples of amines include amines and hydroxyamines including diethylamine, triethylamine, triethanolamine, dimethylethanolamine, etc. The epoxy resins may also be "solubilized" by neutralization with an acid. An example of a commercially available useful acid neutralized water reducible epoxy resin is resin K-5276 available from The Glidden Company.

The amino resins (sometimes referred to as aminoplast resins or polyalkylene amides) useful in the sealcoat compositions are nitrogen-rich polymers containing nitrogen in the amino form, $-NH_2$. The starting amino-bearing material is usually reacted with an aldehyde (e.g., formaldehyde) to form a reactive monomer, which is then polymerized to a thermosetting resin. Examples of amino-bearing materials include urea, melamine, copolymers of both with formaldehyde, thiourea, aniline, dicyanodiamide, toluene sulfonamide, benzoguanamine, ethylene urea and acrylamide. Preferred amino resins are the melamine-formaldehyde and urea-formaldehyde resins.

Condensation products of other amines and amides can also be employed, for example, aldehyde condensates of triazines, diazines, triazoles, guanadines, guanamines and alkyl- and aryl-substituted derivatives of such compounds including alkyl- and aryl-substituted ureas and alkyl- and aryl-substituted melamines. Some examples of such compounds are N,N'-dimethylurea, benzourea, dicyandiamide, 2-chloro-4,6-diamino-1,3,5-triazine and 3,5-diaminotriazole. Other examples of melamine and urea-based cross-linking resins include alkylated melamine resins including methyl melamine-formaldehyde resins such as hexamethoxymethyl melamine, alkoxymethyl melamines and ureas in which the alkoxy groups have 1–4 carbon atoms such as methoxy, ethoxy, propoxy, or butoxymethyl melamines and dialkoxymethyl ureas; alkylol melamines and ureas such as hexamethylol melamine and dimethylol urea. The aminoplast cross-linking resins are particularly useful when another thermosetting resin in the aqueous composition is an alkyd resin, a polyester resin, an epoxy resin or an acrylic resin.

Some particularly useful commercially available aminoplast resins are amino resins sold by American Cyanamid under the general trade designation CYMEL. In particular, CYMEL 301, CYMEL 303 and CYMEL 1156, all of which are alkylated melamine-formaldehyde cross-linking resins, are useful herein. Additional melamine-formaldehyde resins available from American Cyanamid include CYMEL 350, 370, 373, 380, 1116, 1130 and 1158. Benzoguanamines are available from American Cyanamid as CYMEL 1123, 1125 and 1134. Partially alkylated melamine resins from American Cyanamid include CYMEL 235, 243, 245, 248, 255, 270 and 280.

In one embodiment, the aminoplast cross-linking resins are useful in small amounts to cross-link other thermosetting resins such as the water-reducible alkyd resins, water-reducible polyester resins, water-reducible acrylic resins. For example, combinations of epoxy resins and cross-linking amine resins provides improved properties to the coatings.

The polyurethane resins useful in the invention are those formed by reacting an organic diisocyanate with an active hydrogen-containing material such as polyalkylene ether glycols and hydroxy-terminated polyesters to form isocyanate-terminated polyurethane prepolymers which can be cross-linked or cured with known agents such as compounds having at least two amino nitrogen atoms each having at least one reactive hydrogen atom. Alternatively, the active hydrogen compound, organic diisocyanate and chain extender can be reacted in one shot to form the desired polymer.

In the preparation of polyester-urethane resins, there preferably are used hydroxy-terminated polyesters prepared by polycondensation of an aliphatic dicarboxylic acid and a molar excess of an aliphatic glycol, and those prepared by ring-opening polymerization of a cyclic ester of the presence of a difunctional compound as an initiator. The polyesters obtainable by polycondensation of an aliphatic dicarboxylic acid and an aliphatic glycol are exemplified by those obtained by reaction between adipic acid, sebacic acid, maleic acid and other dicarboxylic acids with ethylene-glycol, 1,2-propylene glycol, 1,4-butylene glycol, 1,3- butylene glycol, etc. Examples of the polyesters prepared by polymerization of cyclic esters are those prepared by epsilon-caprolactone, delta-methyl-epsilon-caprolactone and beta-propiolactone in the presence of an initiator such as, for example, 1,4-butylene glycol, ethylene glycol or diethylene glycol.

The polyalkylene ether urethanes are those prepared by reacting the isocyanates with polymeric polyhydroxy compounds which included polyether polyols such as polyalkylene ether glycols, polyalkylene arylene ether-thioether glycols and polyalkylene ether triols. The polyalkylene ether glycols and triols are preferred and these include glycols having the formula $HO(RO)_nH$ wherein R is an alkylene radical which need not necessarily be the same in each instance, and n is an integer. Representative glycols include polyethylene ether glycol, polypropylene ether glycol and polytetramethylene ether glycol. Representative polyalkylene ether triols are made by reacting one or more alkylene oxides with one or more low molecular weight aliphatic triols. The alkylene oxides most commonly used have molecular weights between about 44 and 250 and these include ethylene oxide, propylene oxides, butylene oxides, 1,2-epoxybutane and 2,3-epoxybutane. The ethylene, propylene and butylene oxides are preferred. The aliphatic triols most commonly used have molecular weights between about 92 and 250. Examples include glycerol, 1,2,6-hexane triol and 1,1,1-trimethylol propane.

Representative examples of the polyalkylene ether triols include: polypropylene ether triol (molecular weight 700) made by reacting 608 parts of 1,2-propylene oxide with 92 parts of glycerin and polypropylene ether triol (molecular weight 6000) made by reacting 5866 parts of 1,2-propylene oxide with 132 parts of 1,2,6-hexane triol.

Other active hydrogen-containing compound which can be reacted with polyisocyanates to form urethanes useful in the sealcoat compositions of the invention are long-chain polymers containing at least two groups having at least one active hydrogen atom as determined by the Zerewitinoff method. Examples of such compounds include in addition to the polyesters and polymeric polyhydroxy compounds described above, polyamides, polyepoxides, reaction products of phenols and alkylene oxides, formaldehyde resins, hydrogenation products of olefin-carbon monoxide copolymers and polyepihalohydrins.

The acrylic resins are obtained by polymerizing a suitable combination of a functional group-containing monomer and another copolymerizable monomer in an ordinary manner. The polymerzation temperature is ordinarily between about 60° C. and about 100° C., and polymerization time is usually within a range of about 3 to about 10 hours. Examples of the functional group-containing monomers include hydroxyl group-containing monomers such as beta-hydroxyethyethyl acrylate, beta-hydroxypropyl acrylate, beta-hydroxyethyl methacrylate, beta-hydroxypropyl methacrylate, N-methylol acrylamide and N-methylol methacrylamide; carboxyl group-containing monomers such as acrylic acid, methacrylic acid, itaconic acid, maleic acid, fumaric acid, as well as monoesters of maleic acid and fumaric acid with monoalcohols; alkoxyl group-containing monomers such as N-butoxy-methylmethacrylamide and N-butoxymethylacrylamide; and epoxy group-containing monomers such as glycidyl methacrylate, glycidyl acrylate and allyl glycidyl ether. These monomers may be used either alone or in the form of a combination of two or more of them. The functional group-containing monomer is used in an amount of about 5 to about 40% by weight of total monomers. Examples of the monomers copolymerized with these functional group-containing monomers include olefinically unsaturated monomers such as ethylene propylene and isobutylene; aromatic monomers such as styrene, vinyltoluene and alphamethylstyrene; ester of methacrylic acid and alcohols of 1 to about 18 carbon atoms such as methylmethacrylate, ethylmethacrylate, propylmethacrylate, n-butylmethacrylate, isobutylmethacrylate, cyclohexylmethacrylate, 2-ethylhexylmethacrylate and laurylmethacrylate; vinyl esters of carboxylic acid of about 1 to about 11 carbon atoms such as vinyl acetate, vinyl propionate and vinyl 2-ethylhexylic acid; as well as vinyl chloride, acrylonitrile and methacrylonitrile. They may be used either alone or in the form of a mixture of two or more of them. Commercial examples of useful acrylic resins include CARBOSET CR-785, a styrene-acrylic emulsion from B. F. Goodrich; Resin XC-4005, a water-reducible acrylic from American Cyanamid; etc.

The alkyd resins are obtainable by reacting a dihydric or polyhydric alcohol and a polybasic acid or anhydride in the presence of a drying oil using known techniques. Examples of the dihydric or polyhydric alcohols include glycerol, pentaerythritol, sorbitol and diethylene glycol. Examples of the polybasic acids or anhydrides include phthalic acid, isophthalic acid, maleic anhydride, fumaric anhydride, non-conjugated linoleic acid, oleic acid, adipic acid, azelaic acid, sebacic acid, tetrachlcrophthalic anhydride, and chlorendic anhydride. Examples of the drying oils include soybean oil, linseed oil, dehydrated castor oil, non-oxidizing castor and coconut oils, tung oil, fish oil, sunflower oil, walnut oil, safflower seed oil and tall oil. These alkyd resins may be produced, for example, by direct fusion of glycerol, phthalic anhydride and drying oil at a temperature in the range of from about 210° C. to about 235° C. solvents are then added to adjust the solids content. The amount of drying oil varies depending on the intended use. With respect to the high solids compositions of the invention, the level of drying oil is preferably minimized.

The phenolic resins are any of the several types of synthetic thermosetting resins made by reacting a phenol, cresols, xylenols, p-t-butyl phenol p-phenyl phenol, bisphenols and resorcinol. Examples of the aldehydes include formaldehyde, acetaldehyde and furfural. Phenol-formaldehyde resins are a preferred class of such phenolic resins.

Cyclized olefin rubbers found to be useful in the sealcoat compositions of the present invention include the cyclized rubbers obtainable by isomerization of linear polyolefins such as polyisoprene into ring structures. More particularly, the cyclized rubber can be made by condensing rubber with metallic or metalloid halide catalysts such as stannic chloride, titanium tetrachloride, ferric chloride and antimony pentachloride in a suitable solvent. Upon treatment of the resultant product with acetone or alcohol, the cyclized rubber is formed and recovered. Other procedures for preparing cyclized rubber are described in U.S. Pat. Nos. 1,846,247; 1,853,334. The solvent may be an aromatic solvent such as toluene, xylene, benzene, and high-flash aromatic naphtha.

A commercially available cyclized olefin rubber found to be useful in the sealcoat compositions of the present invention, either alone or in combination with other olefin polymers such as chlorinated polyolefins is a cyclized rubber derived from synthetic rubber by isomerization of the linear polyisoprene. This material is available from Daniel Products Company, Jersey City, N.J., under the general trade designation Synotex 800.

The water-dispersible or emulsifiable film-forming resin utilized in the sealcoat compositions of the present invention also may be halogenated polyolefins such as chlorinated polyethylene, chlorinated polypropylene, mixtures of chlorinated polyethylene and chlorinated polyolefin, etc. Chlorosulfonated polyolefins such as chlorosulfonated polyethylene and chlorosulfonated polypropylene also may be utilized.

Examples of chlorinated polyolefins which are useful in the sealcoat compositions of the present invention include the chlorinated polyolefins available from Eastman Chemical Products, Inc. under the designations CP-343-1 and CP-343-3 which are chlorinated polyolefins in various concentrations of xylene including solutions containing 40% and 50% of the chlorinated polyolefins in xylene. Commercially, available chlorosulfonated polyethylenes are available from the DuPont Company under the general trade designation Hypalon Synthetic Rubber.

Chlorosulfonated olefins such as chlorosulfonated polyethylene are derived from the reaction of a mixture of chlorine and sulfur dioxide on any of the various polyethylenes. The product of this reaction is a chemically modified form of the original polyethylene, and the product may contain from 20% to about 40% chlorine and about 1% to 2% sulfur present mostly as secondary sulfonyl chloride groups ($SRR'CHSO_2Cl$). The sulfonyl chloride groups are available as cross-linking or curing sites.

A number of chlorine containing vinyl-acrylic emulsions are available from ICI Resins which include emulsions containing three polymers, namely, polyvinylidene chloride/ polyvinyl chloride/polyacrylic acid under the general trade designation "Haloflex". For example, Haloflex HA-202 is such a mixture containing 60% solids and 64% chlorine, and Haloflex EP-252 contains 55% solids and 38% chlorine.

Mixtures of one or more of the above-described resins may be used with advantage. For example, mixtures of epoxy resins and amino resins are useful, and the amino resin serves as a cross-linking resin providing unique and desirable properties.

The resins which are utilized in the sealcoat compositions of the present invention may be solubilized by partially or completely neutralizing the resin with a base such as an amine or potassium hydroxide or with acids. Amines and hydroxy-substituted amine such as triethylamine and triethanolamine are examples of amines which have been utilized to neutralize resins for use in sealcoat coating compositions. Coupling agents which assist in solubilizing the resins are frequently added and these include polyol ethers such as, for example, ethylene glycol monobutyl ether (Butyl Cellosolve) and diethylene glycol monobutyl ether (Butyl Carbitol). Water solutions, dispersions and emulsions of thermosetting resins which are useful in the sealcoat compositions of the present invention are available commercially from a variety of sources, and these may be further diluted or concentrated as desired.

In addition to the resin, the sealcoat compositions used in the present invention contain at least one torque modifier. The sealcoat compositions used in the present invention may contain from about 0.1 to about 20%, and preferably about 1 to about 15%, and most preferably about 2 to about 10% by weight based on the weight of resin, of a torque modifier. The torque modifier is added to the sealcoat composition in the form of particles or powders which may be colloidal particles or solid particles. The particles may have average particle diameters of from about 0.1 to about 100 microns, preferably from about 0.5 to about 50 microns, and most preferably from about 1 to about 10 microns. Particles having an average particle size of from 1 to 5 microns are even more particularly preferred, and it is desirable that the particles be characterized by a controlled particle size distribution so that there are few particles of greater than 100 microns in diameter, and preferably few particles of greater than 50 microns or 10 microns in diameter.

Torque modifiers include one or more of fluoroalkene polymers, polyethylene, polypropylene, mica, talc and calcium carbonate. The incorporation of these specific materials as torque modifiers into the sealcoat compositions of the present invention results in the formation of coatings simultaneously exhibiting improved driveability, torque properties and corrosion-resistance. In one embodiment, two or more of the above listed torque modifiers may be used. In another embodiment, three or more of the above listed torque modifiers may be used.

Any polyethylene or polypropylene may be used so long as the size requirements are met. For example, high molecular weight and low molecular weight polymers and high density and low density polymers may be used. Polyethylene and polypropylene copolymers may also be used. Ethylene-propylene copolymers are preferred copolymers. Polyethylene is a preferred torque modifier.

The sealcoat compositions used in the present invention may contain a hydrophobic fluoroalkene polymer as a torque modifier. The fluoroalkene polymers include polymers and copolymers of vinyl fluoride, vinylidene fluoride or tetrafluoroethylene with other polymerizable monomers. The polymers and copolymers may be prepared by suspension polymerization or by bulk polymerization. An example of a commercially available polyvinylidene fluoride is Kynar 202 available from Pennwalt Corp. An example of a polyvinyl fluoride is Tedlar available from E.I. duPont de Nemours & Co.

In another embodiment, the fluoroalkene polymer is a hexafluoropropylene, monochlorotrifluoroethylene or a polytetrafluoroethylene (PTFE). In one preferred embodiment, the fluoroalkene polymer is PTFE. In another preferred embodiment, PTFE and polyethylene are both incorporated into a sealcoat composition. Polytetrafluoroethylene is available commercially from DuPont under the general trade designation "Teflon". Copolymers of tetrafluoroethylene also are useful and these include polymers of $C_2-F_4$ modified with small amounts of mostly fluorinated comonomers; $C_2F_4$ polymers with other fluoroolefins, etc.

One specific example of a commercially available PTFE powder useful in the present invention is Shamrock SST-4 which is available from Shamrock Technologies, Newark, N. J. This powder is characterized as having a 4-micron grind with essentially no particles greater than 10 microns.

In addition to the resin and torque modifier, the sealcoat compositions may also contain other components which modify the properties of the sealcoat compositions and/or the resultant sealcoat deposited on the articles having metal surfaces. Thus, the sealcoat compositions may contain one or more of antioxidants, surfactants, organic phosphate esters, pigments, organic solvents, surface tension modifiers, adhesion promoters, corrosion-inhibiting additives, flow and wetting modifiers;, defoamers, etc. Various antioxidant compounds are described below.

Various surfactants may be optionally included in the sealcoat compositions as surface tension modifiers, and these include nonionic, cationic, anionic and amphoteric surfactants which may be present in amounts of from 0.01 to about 5% by weight based on the weight of resin. These surfactants are known in the art, and many of these are described in McCutcheon's "Volume 1: Emulsifiers and Detergents", 1992, North American Edition, published by McCutcheon's Division, MC Publishing Corp, Glen Rock, N.J., and in particular, pp. 263–274 which lists a number of nonionic anionic, nonionic and amphoteric surfactants is hereby incorporated by reference for the disclosure in this regard. The surfactants may be added to the sealcoat compositions directly, or the surfactant may be present in some of the other components used to form the sealcoat compositions of the invention. For example, some commercial resin dispersions contain surfactants for stability. In these instances, the amount of surfactant added to the sealcoat compositions can be reduced in proportion to the amount of surfactant supplied by resin dispersions used to form the sealcoat compositions.

In one embodiment, the sealcoat compositions may contain surfactants which are acetylenic diols such as those available from Air Products under the general designation "Surfynol". Examples include Surfynol 104 which is described as 2,4,7,9-tetramethyl-5-decyn-4,7-diol (or "tetramethyl decynediol"). Solutions of this diol in various solvents are available under designations 104A, 104E, 104H and 104BC. Proprietary blends of acetylenic diols are available from Air Products under designations such as Surfynol GA, SE, TG and PC. Surfynol 61 is dimethyl hexynediol and Surfynol 82 is dimethyl octynediol. Ethoxylated derivatives of tetramethyl decynediol are available as Surfynol 440, 465 and 485.

In another embodiment, the sealcoat compositions used in the present invention, particularly those containing a hydrophobic fluoroalkene polymer as the torque modifier, may optionally contain a small but effective amount of at least one nonionic fluorocarbon surfactant as a surface tension modifier. Generally, this amount will range from about 0.01 to about 5% by weight based on the weight of the resin present in the sealcoat composition. Alternatively, the amount of fluorocarbon surfactant present in the dispersion may be from about 5 to about 40% by weight based on the weight of any fluoroalkene polymers present in the dispersion. Larger amounts of the fluorocarbon may be included in the sealcoat compositions but are not generally required. In one embodiment, the amount of fluorocarbon surfactant included in the sealcoat composition is an amount which is effective in stabilizing the sealcoat composition. The fluorocarbon surfactant is surface-active and is also added to the sealcoat compositions to modify the surface charge of the polymer particles in the film-forming thermosetting resin and the fluorocarbon polymer particles. A stable dispersion is one which does not settle or is one which is easily dispersible when some sedimentation occurs.

The fluorocarbon surfactants which are particularly useful in the sealcoat compositions of the present invention are nonionic fluorosurfactants which may be fluoro-containing compounds of the polyethylene glycol type, alkyl alkoxylates and alkyl esters. Among the preferred fluorosurfactants useful in the present invention are the fluorinated alkyl polyoxyethylene alcohols, and particularly those nonionic fluorocarbons having perfluorinated hydrocarbon chains in their structure. One type of such perfluorinated hydrocarbon chain containing surfactants comprise the fluorocarbons characterized by the following formula

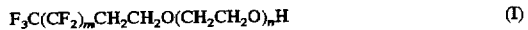

$$F_3C(CF_2)_mCH_2CH_2O(CH_2CH_2O)_nH \qquad (I)$$

wherein m is from about 3 to about 19 and n is from about 6 to about 19, more preferably from about 7 to about 13. In another embodiment of Formula I, m is from 5 to about 9 and n is about 11. Various surfactants characterized by Formula I will have the perfluoroalkyl and polyethylene oxide portions thereof selected to provide a satisfactory film of the surfactant on the particles of the dispersion. The fluorocarbon surfactants are either liquid or are sufficiently soluble, emulsifiable or dispersible in water.

In lieu of the perfluoroalkyl moiety of the surfactants of Formula I, the fluorosurfactants may contain partially fluorinated hydrocarbon moieties or a fluorochloro or fluorobromo moiety. Generally, however, it is preferred that the hydrocarbyl or other aliphatic lipophilic portion of this surfactant should have at least half of the hydrogen which could be present on the carbon atoms thereof replaced by fluorine atoms. Such surfactants can be made by ethoxylation of the corresponding fluorinated alkanol, e.g., perfluoroalkylethanol. Fluorocarbon surfactants useful in the present invention which are fluorinated alkyl-based polyoxyethylene alcohols are available commercially such as from DuPont under the general trade designation "Zonyl FSN" and from the 3M Company under the general trade designation "Fluorad". In particular, Zonyl FSN is believed to be a perfluorinated surfactant represented by Formula I wherein m is from 5 to 9 and n is about 11. Specific nonionic fluorocarbon surfactants which are available from DuPont include FSN, FSN-100, FSO and FSO-100. A specific example of a fluorinated alkyl-based polyoxyethylene alcohol available from the 3M Company is Fluorad FC 170C.

In lieu of the ether-type fluorocarbon surfactants described above, the sealcoat compositions of the present invention may contain other nonionic analogues such as esters which can be made, for example, by polyethoxylation of the corresponding perfluoroalkylated lower carboxylic acid. Such surfactants are available from the 3M Company under the designations Fluorad FC-430, FC-431 and FC-740. A fluorinated alkyl alkoxylate surfactant also is available from 3M under the designation Fluorad FC-171.

Another useful surface tension modifier is a product available from Daniel Products under the trade designation DAPRO W-77. This product contains a mixture of anionic and nonionic surfactants, 2-butoxyethanol and water.

The sealcoat compositions may also contain defoamers to control the foaming tendencies of the compositions. The choice of defoamer is not critical. Examples of organic solvents which are effective defoamers include xylene, mesitylene, benzene, aromatic petroleum spirits, methyl isobutyl ketone, and mixtures thereof. Mineral spirits added in small amounts to the sealcoat compositions is an example of an effective defoamer.

In addition to the above components, the sealcoat compositions used in the present invention may optionally contain from about 0.01 to about 5% by weight based on the total weight of the sealcoat composition, of an organic phosphate ester. The inclusion of an organic phosphate ester compound in the sealcoat compositions provides the composition with additional corrosion resistance. The organic phosphate ester useful in the sealcoat compositions may contain the product of the reaction of: a copolymer of allyl alcohol and a styrene; an epoxy aryl ether; and a phosphoric acid. In one embodiment, the organic phosphate ester will comprise the reaction product of about one part of a copolymer of allyl alcohol and a styrene, from about 0.05 to about 5 parts of an epoxy aryl ether and from about 0.1 to about 2 parts of phosphoric acid. The reaction may be conveniently conducted by heating the three components, usually in an organic solvent which may be either a volatile or non-volatile solvent. Examples of volatile solvents included methyl, isobutyl, ketone, isobutyl alcohol, ethyl acetate, etc. An example of a relatively non-volatile solvent is butyl Cellosolve.

The copolymer of allyl alcohol and a styrene preferably is a low molecular weight copolymer prepared from an approximately equimolar mixture of the two monomers. The molecular weight of the copolymer is preferably within the range of from about 500 to about 2500. The styrene monomer may be styrene itself or it may be any of the various substituted styrenes such as monochlorostyrene, alkyl-substituted styrene and alpha-substituted styrene in which the alpha substituent is preferably an alkyl group such as a methyl group. Alkyl-substituted styrenes include 3-methyl styrene, 4-methyl styrene, 3-ethyl styrene, etc. Styrene is the preferred monomer.

The epoxy aryl ethers are compounds which contain both epoxy groups and aryl ether groups, and they are prepared conveniently by the reaction of epichlorohydrin with phenolic compounds. Accordingly, in one embodiment, the epoxy aryl ethers may be epoxy resins of the type identified above as examples of the film-forming thermosetting resins useful in the sealcoat compositions of the present invention although the epoxy aryl ethers useful in preparing the organic phosphate esters are generally low molecular weight resins such as those having molecular weights of from about 500 to about 2000, although resins having higher molecular weights are also useful.

Generally, for the purposes of this invention, the epoxy aryl ethers are prepared by reacting epichlorohydrin with bisphenol A (di-hydroxyphenyl dimethylomethane), or a phenol formaldehyde resin, or other such aldehydephenol resins. Commercially available epoxy resins prepared from bisphenol A include the Epon resins marketed by Shell Chemical Company; the Epotuf resins marketed by the Reichhold Chemical Company; and the D.E.R. resins marketed by the Dow Chemical Company. Phenol-formaldehyde-type resins are available from Dow under the designation D.E.N. resins.

Other phenols may be used including polyhydric phenols. Examples of such phenols are resorcinol, hydroquinone, catechol and analogous polyhydric anthracines and naphthalenes. In addition to epichlorohydrin which is preferred, various other halohydrins may be used such as epibromohydrin, and the epihalohydrins of mannitol, sorbitol and aerythritol.

The preferred epoxy aryl ethers used in the reaction to form the organic phosphate esters are those which contain on the average more than one epoxy group and more than one aryl ether group per molecule. A specific example of such a resin is Epotuf 38-501 which is derived from bis-phenol A and characterized as having two epoxy groups, two bis-phenol-derived groups per molecule. The product an epoxy equivalent weight of from 450 to 525 and a molecular weight of about 908.

The phosphoric acid reactant is preferably 85% aqueous phosphoric acid. More concentrated phosphoric acid solutions can be used, and in some instances, 100% phosphoric acid or even a more concentrated form of phosphorus pentoxide can be used. In some instances, it may desirable to use less concentrated phosphoric acid solution such as for example 60% phosphoric acid or even 25% phosphoric acid.

The organic phosphate esters can be prepared by reacting the above components at an elevated temperature generally in the presence of a solvent. Temperatures up to the reflux temperature of the reaction mixture can be utilized and the reaction generally is completed in a period of from 0.5 to about 5 to 10 hours. Any water which is formed during the reaction may be removed from the reaction mixture as a in azeotrope.

The following examples A and B illustrate the preparation of these organic phosphate esters. Additional examples and description of such phosphate esters and methods of preparing them are found in U.S. Pat. No. 3,133,838. The disclosure of this patent is incorporated herein by reference. Unless otherwise indicated in the following examples and elsewhere in the specification and claims, all parts and percentages are by weight, temperatures are in degrees Centigrade and pressures are at or near atmospheric pressure.

EXAMPLE A

A mixture containing 29 parts of butyl Cellosolve, 11.6 parts of 85% phosphoric acid, 30 parts of Epotuf 38-501 and 29.2 parts of an allyl alcohol:styrene copolymer available from Monsanto under the designation RJ-101 is prepared and heated at the reflux temperature for 5 hours.

EXAMPLE B

A solution of 54 parts of a copolymer of equimolar proportions of allyl alcohol and styrene (molecular weight= 1100) in 54 parts of methyl isobutyl ketone is added to a solution of 41.4 parts of an epoxy aryl ether (molecular weight=950) prepared by the reaction of bisphenol A and epichlorohydrin, in 14 grams of a 2:1 mixture of methyl isobutyl ketone and xylene. To this resulting solution there are added 336 parts of a 2:1:1 mixture of methyl isobutyl ketone, ethyl acetate and isobutyl alcohol followed by the addition of 100 parts of 85% aqueous phosphoric acid. This mixture is heated at the reflux temperature for about 5 hours and cooled. The contents of the reactor is recovered as reaction product.

The organic phosphate esters which may be utilized in the sealcoat compositions of the present invention may also comprise the reaction product of a copolymer of allyl alcohol and a styrene, an alkyl phenol, and phosphorus pentoxide. Some of these types of phosphate esters are described in U.S. Pat. No. 3,055,865. The disclosure of this patent is incorporated herein for its description of such esters and the method of preparing them. Generally such phosphate esters can be prepared by mixing one mole of phosphorus pentoxide from about 0.2 to about 12.5 moles of a copolymer of allyl alcohol in a styrene and from about 0.3 to about 5 moles of an alkyl phenol, and heating said mixture at a temperature within the range of from about 75° C. to about 150° C.

The copolymers of allyl alcohol and a styrene useful in this embodiment may be any of the copolymers of allyl alcohol and styrene described above. Generally, the molecular weight of the copolymer used in this embodiment should be within the range of from about 750 to about 1500.

The alkyl phenol reactant may be either a mono-alkyl or a poly-alkyl phenol. The alkyl group may range from methyl groups up to alkyl groups derived from olefin polymers having molecular weights as high as 50,000. Preferably, the alkyl phenol is a mono-alkyl phenol in which the alkyl group contains from 1 to about 10 carbon atoms such as cresol, amyl phenol, heptyl phenol, nonyl phenol, etc.

The organic phosphate esters are produced in accordance with this embodiment by mixing the specified reactions, preferably in a solvent, and heating the resulting solution at a temperature within the range of from about 75° C. to 150° C. until the reaction is complete. The following example C also illustrates the preparation of such an organic phosphate ester.

EXAMPLE C

A mixture of 1412 parts (1.2 moles) of a 1:1 molar copolymer of allyl alcohol and styrene having an average molecular weight of about 1100, 168 parts (1 mole) of tert-amyl phenol, 68 parts (0.5 mole) of phosphorus pentoxide and 1648 parts of xylene is prepared at room temperature and then heated at reflux (about 141° C.) for 6 hours. The reaction mixture is stirred throughout this period, and at the end of this period, the xylene is removed by distillation to yield a plastic, non-viscous mass which is diluted with a solvent such as isobutyl alcohol.

The sealcoat compositions used in the present invention may optionally contain pigments which may be inorganic pigments or dyes. The choice of pigment will depend upon the particular color or colors desired in the coatings. The amount of pigment incorporated into the sealcoat compositions of the present invention will be from about 0 to about 25% by weight or more of the total weight of the composition.

Carbon blacks are well-known color pigments often utilized in black formulations. Among the carbon blacks which may be utilized as color pigments in the present invention are furnace blacks, channel blacks and lamp blacks. The pigment powder also may be ) metal powders, metal oxides and other inorganic compounds. Examples of metallic powders include nickel, nickel flakes, steel flakes, bronze powder, aluminum powder, etc. Among the metallic oxides which can be utilized as pigments are zinc oxide, aluminum oxide, magnesium oxide, silicon, clay, iron oxide red, iron oxide yellow, chrome oxide green and titanium oxide white. Other inorganic pigments which may be utilized to provide desired colors include zinc sulfide, cadmium sulfide, cadmium sulfo-selenide, cadmium mercury, zinc molybdate, zinc chromate, cobalt aluminate, chrome cobalt-alumina, ultra marine blue and lead carbonate. Organic pigments include Para Red, Lithol Rubine, Halio Bordeaux, Thio Indigo, Toluidine, Anthraquinone, Phthalocyanine Blue, Phthalocyanine Green, Azo, etc.

The sealcoat compositions used in the present invention may be prepared in concentrated form containing, for example, from 30 to 70% of solids, and these concentrated dispersions can be diluted with water to form the bath useful for coating the metal substrates. The diluted baths generally will contain from about 5 to 25% by weight of solids, and in one embodiment, about 1 5% solids. The bath generally is maintained under constant agitation to prevent settling, and the bath is allowed to equilibrate (e.g., at least 24 hours) before coating treated or untreated metal surfaces.

A sealcoat coating or film is applied to the treated or untreated metal article by contacting the metal article with a composition comprising at least one film-forming organic resin as a first component and at least one torque modifier as a second component, which together constitute the sealcoat coating. The sealcoat is not applied electrophoretically, but instead may be applied by any other technique known to those skilled in the art including immersion, flooding, spraying, dipping, role coating etc.

The compositions used to apply or deposit the sealcoat may contain any of the resins described above dissolved in a liquid carrier such as an organic solvent or dispersed or emulsified in water. Because of environmental considerations, aqueous compositions are preferred. The concentration of the resin(s) in the liquid carrier may range from about 3% to about 40% by weight and preferably from about 4% to about 25% by weight. The concentration of the torque modifier(s) in the liquid carrier may range from about 0.1% to about 12% by weight and preferably from about 1% to about 5% by weight.

The following Examples 1–6 illustrate aqueous compositions which can be used to deposit the sealcoat.

Example 1

| Components | Amount (pbw) |
| --- | --- |
| Kelsol 3907[1] | 15.80 |
| Cymel 303 | 3.00 |
| Dimethylethanolamine | 0.50 |
| Silane A-1106 | 0.20 |
| Dapro W-77 | 0.20 |
| Mineral spirits | 0.30 |
| Shamrock SST-4 | 2.0 |
| Polyethylene | 2.0 |
| Water Reduction | 39.00 |
| Water | 37.00 |
| Nominal Solids: | |
| 15.15% w | |
| 13.60% v | |

[1]Water reducible alkyd from Reichhold.

Example 2

| Components | Amount (pbw) |
| --- | --- |
| Cargill 7289 | 16.00 |
| Cymel 303 | 3.00 |
| Dimethyloethanolamine | 0.50 |
| Dapro W-77 | 0.20 |
| Mineral spirits | 0.30 |
| Kynar 202 | 12.0 |
| Water Reduction | 35.00 |
| Water | 33.00 |
| Nominal Solids: | |
| 14.94% w | |
| 12.76% v | |

Example 3

| Components | Amount (pbw) |
| --- | --- |
| Resin XC-4005[2] | 15.80 |
| Cymel 303 | 3.00 |
| Dimethylethanolamine | 0.50 |
| Silane A-1106 | 0.20 |
| Dapro W-77 | 0.20 |
| Mineral spirits | 0.30 |
| Tedlar | 1.0 |
| Water Reduction | 41.00 |
| Water | 38.00 |
| Nominal Solids: | |
| 15.15% w | |
| 13.67% v | |

[2]Water-reducible acrylic from American Cyanamid.

Example 4

| Components | Amount (pbw) |
| --- | --- |
| Methylon 75108[3] | 20.00 |
| Butyl cellosolve | 10.00 |
| Dapro W-77 | 0.60 |
| Mineral spirits | 0.40 |
| Polypropylene | 3.0 |
| Water | 66.00 |
| Nominal Solids: | |
| 20.30% w | |
| 17.65% v | |

[3]Water-reducible phenolic from Oxychem.

Example 5

| Components | Amount (pbw) |
| --- | --- |
| Haloflex 307[4] | 25.0 |
| 28° Aqueous ammonia | 0.60 |
| Butyl cellosolve | 2.00 |
| Foamaster S | 0.40 |
| mica | 9.0 |
| Water | 63.00 |
| Nominal Solids: | |
| 15.86% w | |
| 10.59% v | |

[4]Resin emulsion from ICI Resins.

Example 6

| Components | Amount (pbw) |
| --- | --- |
| Resin K 5276[5] | 23.80 |
| $H_3PO_4$ (75%) | 0.15 |
| Lactic acid (88%) | 0.80 |
| Dapro W-77 | 0.60 |
| Mineral spirits | 0.30 |
| talc | 3.0 |
| Calcium carbonate | 3.0 |
| Water | 68.35 |
| Nominal Solids: | |
| 15.80% w | |
| 13.50% v | |

[5]Water-reducible epoxy from Glidden.

The sealcoats which are deposited as described above on treated or untreated metal substrates generally are baked at temperatures sufficient to cause cross-linking of the thermosetting resin(s) and to produce a protective finish. Usually, temperatures of from about 90° C. to about 600° C. may be utilized, but more generally temperatures of from about 120° C. to about 200° C. are satisfactory. Curing times of from 1 to 60 minutes may be used, the longer periods of time being used when lower baking temperatures are used. The sealcoats deposited in accordance with the present invention exhibit good adhesion to the treated or untreated metal surfaces of parts, especially small metal parts.

Antioxidant Coating

The process of the present invention may also include the application of an antioxidant coating. The antioxidant coating improves corrosion resistance of the treated or untreated metal surface while minimizing white corrosion. White corrosion is commonly referred to as zinc oxide bloom.

In one embodiment, the antioxidant coating is the same coating as the sealcoat. In this embodiment, the sealcoat composition contains a liquid carrier, at least one organic resin, at least one torque modifier and an antioxidant compound. In embodiments where the antioxidant compound is included in the sealcoat composition, the antioxidant compound is simply added and blended into the composition prior to application to the treated or untreated metal surfaces.

In another embodiment, the antioxidant coating is a separate coating from the sealcoat. The antioxidant coating, in embodiments where it is a separate coating from the sealcoat, may be applied either before or after applying and/or curing the sealcoat.

Antioxidant compounds are generally organic compounds. General examples include hydroxy phosphono acetic acid, antioxidant copolymers such as itaconic acid-acrylonitrile copolymers, polyacrylic acids, aromatic amines, and substituted phenolic compounds. Specific examples include: sodium hypophosphite, sodium hypophosphite monohydrite, hypophosphorous acid, and sodium hypophosphite monohydrate available from Rhone-Poulenc, hindered phenolic derivatives available under the trade name Alvinox from 3-V Inc., butylated hydroxytoluene, dilaurylthiodipropionate, dimyristylthiodipropioniate, distearylthiodipropionate, ditridecylthiodipropionate, mixed esters of thiodipropionate, hydroquinone derivatives such as di-t-butylhydroquinone, hydroquinonemonomethylether, hydroquinone, mono-t-butylhydroquinone available from Eastman Chemical Company, purified kraft pine ligman available under the trade name Indulin AT from West Vaco Corp., alkylated phenyl α-naptholamine and alkylated diphenylamine available under the trade name Irganox® from Ciba-Geigy Corp., sulfur-containing bisphenol and hindered phenols available under the trade name Irganox® from Ciba-Geigy Corp., alkylated phenols and polymeric hindered phenols and thioester blends generally available under the trade name Octolite from Tiarco Chemical Division, di-β-napthol-p-phenylenediamine, phenyl-β-naptholamine, butylated hydroxyanosol, di-t-butyl-p-cresol, and propylgalate, and combinations thereof.

The compositions utilized to deposit an a intioxidant coating may contain any of the water-dispersible, thermosetting and/or emulsifiable film-forming resin components described in the Sealcoat section above or the Additional Organic Film section below. The antioxidant coating compositions may contain any of the other additives describe as useful in the sealcoat compositions or additional organic film compositions. The antioxidant coating composition may be the same or different from the sealcoat composition and/or the additional organic film composition. The antioxidant coating compositions can be deposited in any manner known to those skilled in the art including the procedures described for depositing the sealcoat and the additional organic film.

Additional Organic Film

A protective film of a siccative organic coating composition may optionally be applied to a treated or untreated metal surface, so long as the metal surface is not a phosphated metal surface, by an anodic or cathodic electrophoretic process of painting metal surfaces.

With cathodic electrocoating, the siccative organic coating contains a basic polymer resin which has been neutralized with a soluble acid. During electrocoating, an amine, such as triethylamine or triethanolamine, takes on a hydrogen ion (and a positive charge) and is attracted to the cathode where the hydrogen is liberated. The amine or other neutralizing agent is not completely deposited in the coating and will stay in the bath except for small amounts which are lost through dragout to maintain a relatively constant level of amine. The bath may be treated in an ultra filter or other suitable device to remove amines and other low molecular weight contaminants from the working bath.

In the electrophoretic process, the article having a treated or untreated metal surface to be coated is placed in an electrolytic solution which contains water-emulsified colloidal paint particles. The metal surface to be painted may be either the anode or the cathode, depending on the characteristics of the paint which is used.

The electrophoretic application of the paint may be carried out in various ways as are known to those skilled in the art. Typically an electric charge is passed through both the metal surface and the water-based paint by placing a positive charge on the metal surface which acts as an electrode, and a negative charge on the second electrode, generally the container of the paint. An alternative method would be to charge the container or parts with a positive charge, which acts as an electrode transmitting its charge to the parts. In this electric field, the colloidal particles of the paint which are in suspension move either toward the negative or positive electrode depending on the charge carried by the dispersed particles. In one embodiment, negative paint particles are attracted to the metal surface having a positive charge. Upon contact with the metal surface of the parts, the colloidal particles lose their electrical charge, thereby breaking the emulsion and depositing as a coating on the electrode. The article having a metal surface or container of metal articles is then removed from the solution, rinsed, and baked in an oven to cure the deposited coating.

The electrical potential applied in the process of electrophoresis is determined by the desired thickness of the coating, the conductivity and the composition of the coating bath, and the time allotted for the formation of the coating. Voltages of from about 50 to 1000 volts have proven satisfactory at a current density of from about 0.1 to about 7 amperes per square foot. Normally, the additional organic film composition is at substantially room temperature, but elevated temperatures, for example, from 20° C. to 40° C. and even higher, may be used if desired. The deposition process requires about 10 seconds to about 10 minutes.

Electrophoresis can be carried out on treated or untreated metal articles maintained on racks of individually hung parts, or the articles may be contained in a porous tray or in a porous barrel. A preferred procedure for electrocoating small metal parts in accordance with this invention involves placing the parts to be treated on a porous tray or in a porous container which can be vibrated, jolted, jogged or rotated to cause the parts to move during the electrophoretic deposition process. For example, a porous container can be jogged or jolted by means of an eccentric effective to lift and drop the container a given vertical distance at a given frequency. Alternatively, the parts can be placed in a rotatable, porous barrel, and the barrel of parts can be processed through the optional steps of cleaning, phosphating in one embodiment, and chromic or non-chromic acid rinse (examples of non-chromic acid rinses include solutions of borated amines, zirconates, titanates, and fatty acid amine soars such as alkanol amines). The barrel containing the articles having treated or untreated metal surfaces may then be immersed in the electrocoat resin system either after drying the parts or while still wet.

In one embodiment the barrel of parts is rotated intermittently for five minutes at about 25°–30° C. and at a voltage of from about 25 to about 350 volts. The number of rotation cycles employed may be varied depending upon the type and quantity of parts in the barrel. The amperage drawn is a function of the area of the barrel but it is typically from 1 to about 5 amps per square foot. The parts may then be removed from the barrel (or other porous container).

In preferred embodiments, the barrel is fabricated of 316 SS so that it may be employed throughout the coating cycle including any additional or optional treatment step. The sides of the barrel should be of ⅛" to ½" mesh to allow proper solution flow. Optionally the barrel may be constructed of plastic and lined with 316 SS screen to provide sufficient electrode area.

At times it may be desirable to employ additional electrodes with the barrel to improve current flow, although normally the barrel itself provides sufficient electrode area.

Compositions which can optionally be electrophoretically deposited as an additional organic film in the method of the present invention contain the various components described in the Sealcoat section and can be prepared by those skilled in the art. In addition, additional organic film compositions which can be electrodeposited in accordance with the method of the present invention are available commercially such as a water-reducible epoxy resin pigmented black which is available from Man-Gill Chemical Company; a black cathodic paint emulsion available from The Glidden Co.; etc.

The compositions utilized to deposit an additional organic film may contain any of the water-dispersible, thermosetting and/or emulsifiable film-forming resin components described in the Sealcoat section and preferably those which can be deposited on the treated or untreated metal surface electrophoretically. The additional organic film compositions may contain any of the other additives described as useful in the sealcoat compositions. Although the composition utilized as the sealcoat is generally different from any additional organic film composition, the compositions may, in some embodiments, be substantially identical. The deposited coatings may or may not be subjected to elevated temperatures for baking and/or curing until both films have been deposited on the treated or untreated metal surface. In other words, in embodiments where a sealcoat band an additional organic film are applied to a treated or untreated metal surface, the sealcoat and the additional organic film may be cured at the same time or separately. The electrophoretically deposited film may be rinsed with water to remove impurities prior to or after the application of the sealcoat.

The following examples illustrate aqueous additional organic film compositions which may be electrodeposited on treated or untreated metal articles in accordance with the process of the invention. Examples 7–9 illustrate the preparation of additional organic film compositions which contain water and a dispersible, thermosetting and/or emulsifiable film-forming resin.

Example 7

A first aqueous mixture is prepared which is a grind paste comprising 7.04 parts of Epotuf 38-690 epoxy resin neutralized with 1.2 parts of dimethylethanolamine, 1.01 parts of Surfynol 104 BC which is 50% solution of 2,4,7,9-tetramethyl-5-9-decyn-4,7-diol in 2-butoxyethanol (available from Air Products), 0.51 part of a foam control agent (Drewplus L-475 from Drew Industrial Division of Ashland Chemical Company), 2.79 parts of carbon black (Raven 1250 from Columbian Carbon) and 11.81 parts of deionized water by mixing at high speed until smooth. A second mixture is prepared with a high-speed grinding operation to a Hegman 5+ grind which comprises 14.16 parts of deionized water, 7.62 parts of Vantalc 6H, a magnesium silicate pigment from R. T. Vanderbilt Company, and 0.94 part of dimethylethanolamine. To this second mixture is then added a mixture of 20.8 parts of Epotuf 38-690, 6.72 parts of a tenzoguanamine available from American Cyanamid as Cymel 1123 and 0.58 parts of triethanolamine, and then combined with the first mixture. The viscosity is adjusted by adding 4 parts of deionized water. The mixture is filtered through a 150 micron filter, and the filtrate is the desired aqueous composition suitable for electrophoretic application.

Example 8

A first aqueous mixture is prepared which is a grind paste comprising 7.04 parts of Epotuf 38-690 epoxy resin neutralized with 1.2 parts of dimethylethanolamine, 1.01 parts of Surfynol 104 BC which is 50% solution of 2,4,7,9-tetramethyl-5-9-decyn-4,7-diol in 2-butoxyethanol (available from Air Products), 0.51 part of a foam control agent (Drewplus L-475 from Drew Industrial Division of Ashland Chemical Company), 2.79 parts of carbon black (Raven 1250 from Columbian Carbon) and 11.81 parts of deionized water by mixing at high speed until smooth. A second mixture is prepared with a high-speed grinding operation to a Hegman 5+ grind which comprises 14.16 parts of deionized water, 7.62 parts of Vantalc 6H, a magnesium silicate pigment from R. T. Vanderbilt Company, and 0.94 part of dimethylethanolamine. To this second mixture is then added a mixture of 20.8 parts of Epotuf 38-690, 6.72 parts of a benzoguanamine available from American Cyanamid as Cymel 1123 and 0.58 parts of triethanolamine. A third mixture comprising one part of an organic phosphate ester similar to Example A, 1 part of butyl Cellosolve and 1 part of deionized water is prepared and is neutralized to a pH of about 7.0 with 0.1 part of triethanol amine. This third mixture is then added to a container containing mixtures 1 and 2. The viscosity is adjusted by adding 4 parts of deionized water. The mixture is filtered through a 150 micron filter, and the filtrate is the desired aqueous composition suitable for electrophoretic application.

Example 9

A first aqueous mixture is prepared which is a grind paste comprising 7.04 parts of Epotuf 38-690 epoxy resin neutralized with 1.2 parts of dimethylethanolamine, 1.01 parts of Surfynol 104 BC, 0.51 part of a foam control agent (Drew L-475 from Drew Industrial Division of Ashland Chemical Company), 2.79 parts of carbon black (Raven 1250 from Columbia Carbon) and 8.8 parts of deionized water by mixing at a high-speed grinding operation (Pebble Mill or Sand Mill) until the Hegman 6+ is achieved. Water (6 parts) is added to the mixture. A second mixture is prepared with a high-speed grinding operation to a Hegman 5+ grind which comprises 24.96 parts of deionized water, 0.94 parts of dimethylethanolamine and 7.62 parts of Vantalc 6H, a magnesium silicate pigment from R. T. Vanderbilt Company. To the second mixture there is added a mixture of 28.48 parts of Epotuf 38-690, 6.27 parts of benzoguanamine available from American Cyanamid as Cymel 1123, and 0.58 part of triethanolamine. This second mixture is then combined with the first mixture, and the viscosity is adjusted by adding 2.18 parts of deionized water. The mixture is filtered through 150 micron filter, and the filtrate is the desired aqueous composition.

Phosphate Coating

With one exception, the invention contemplates treating non-phosphated metal surfaces which do not have a phosphate coating, or in other words, have not been treated with a phosphate solution. In some instances, a phosphate coating, especially in the presence of additional organic films or coatings, can undesirably decrease the effectiveness of the sealcoat. As a result, most embodiments of the invention are directed to applying a sealcoat to non-phosphated metal surfaces. The one exception involves applying only a sealcoat to a phosphated metal surface (where no other siccative organic coating is previously or subsequently applied to the sealcoated phosphated metal surface). For purposes of this invention, non-phosphated metal surfaces have not been treated in the manner described below. Analogously on the contrary, phosphated metal surfaces are treated in the manner described below.

An aqueous phosphating solution may be used to deposit a phosphate coating on a metal surface. The use of zinc, lead, iron and manganese phosphate solutions (and combinations thereof) is preferred. It is well known in the metal finishing art to provide metal surfaces with an inorganic phosphate coating by contacting them with aqueous phosphating solutions. These aqueous solutions contain the phosphate ion and, optionally, certain auxiliary ions including metallic ions such as zinc, cadmium, iron, copper, lead, nickel, cobalt, calcium, magnesium, mancanese, strontium, barium, and antimony ions and non-metallic ions such as ammonium, chloride, bromide, nitrite, and chlorate ions. These auxiliary ions modify the character of the phosphate coating and adapt the solutions for a wide variety of applications.

The preparation and use of aqueous phosphating solutions is well known in the metal finishing art as shown by U.S. Pat. Nos. 1,206,075; 1,485,025; 2,001,754; 2,859,145; 3,090,709; 3,104,177; 3,307,979; and 3,458,364.The disclosures of these patents regarding inorganic phosphating solutions and the procedures for using such solution are hereby incorporated by reference.

The inorganic phosphate coatings may be any of those known in the art including zinc phosphate coatings, manganese-zinc phosphate coatings, iron phosphate coatings, lead phosphate coatings, and mixed calcium-zinc phosphate coatings. The iron phosphate coatings can be applied over iron, steel or alloys thereof, and the zinc phosphate coatings generally are applied over aluminum, iron, steel, zinc, or alloys thereof.

In view of the extensive commercial development of the phosphating art and the many journal publications and patents describing the preparation and application of phosphating solutions, it is believed unnecessary to lengthen this specification unduly by a detailed recitation of the many ways in which the application of metal phosphate coatings can be accomplished. It should be sufficient to indicate that any of the commonly used phosphating techniques such as spraying, brushing, dipping, roller-coating, or flow-coating may be employed, and that the temperature of the aqueous phosphating solution may vary within wide limits such as, for example, from room temperature to about 100° C. Generally, best results are obtained when the aqueous phosphating solution is used at a temperature within the range of from about 65° C. to about 100° C. If desired, however, the phosphating baths may be used at higher temperatures when employing super atmospheric pressures.

In the ordinary practice of phosphating a metal surface, the surface generally is cleaned initially by physical and/or chemical means to remove any grease, dirt, or oxides, and then it is phosphated in the manner described above. Cleaning solutions are known in the art and generally are aqueous solutions containing sodium hydroxide, sodium carbonate, an alkali metal silicate, alkali metal metaborate, water softeners, phosphates, and surface active agents. Oxide removal is usually accomplished with mineral acid pickles such as sulfuric acid, hydrochloric acid, and phosphoric acid or organic acids such as citric acid. This removal could be considered as supplemental cleaning.

The phosphating operation usually is carried out until the desired weight of the phosphate coating is formed on the metallic surface. In the phosphating art, "heavy phosphate" coatings are generally deposited in an amount in excess of 750 mg/ft$^2$ of surface. Lesser amounts of coatings are referred to as "light phosphate " coatings. The time required to form the coating will vary according to the temperature, the type of phosphating solution employed, the particular technique of applying the phosphating solution, and the coating weight desired. In most instances, however, the time required to produce the phosphate coating of the weight preferred for the purpose of the first step of the present invention will be within the range of from about 1 second to as long as 15 to 40 minutes, and preferably from about 3 seconds to about 10 minutes, depending on the type of phosphating solution. When high total acid aqueous phosphating solutions are used, the immersion time is from about a few seconds to one to two minutes.

After the desired contact between the surfaces to be treated and the phosphate solution has been effected for the desired period of time, the phosphated article may be rinsed with water to remove any of the acidic coating solution which may remain on the surface. Preferably, a warm water rinse is used with water temperatures within a range of from about 40° C. to about 80° C. As with the application of the phosphate coating solution, various contacting techniques may be used, with rinsing by dipping or spraying being preferred.

In addition to or in place of the water rinse, the phosphated article can be contacted with an under-paint corrosion inhibitor which may be an aqueous solution containing a composition which seals the phosphate coating prior to the application of the sealcoat coating. Examples of aqueous solutions of compositions include aqueous solutions of alkali metal nitrites, alkali metal fluozirconates, ammonium phosphates, etc. Specific examples include aqueous solutions containing sodium nitrite, diammonium phosphate, sodium fluorozirconate, potassium fluorozirconate, mixtures of diammonium phosphate and sodium chlorate, etc.

In another embodiment, the phosphated articles can be rinsed with a hot dilute aqueous solution of chromic acid containing trivalent or hexavalent chromium calculated as $CrO_3$, typically in an amount within the range of from about 0.01 to about 1% by weight of the solution. The chromic acid rinse appears to "seal" the phosphate coating and improve its utility as a base for the application of the sealcoat coating.

Various water-soluble or water-dispersible sources of hexavalent chromium may be used in formulating the rinsing solution, provided the anions and the cations introduced with the hexavalent chromium do not have a detrimental effect on either the solution itself or the coated surfaces. Exemplary of hexavalent chromium materials which may be used are chromic acid, the alkali metal and ammonium chromate, the alkali metal and ammonium dichromates, the heavy metal chroniates and dichromates such as those of zinc, calcium, chromium, ferric ion, magnesium, and aluminum. Chromic acid-phosphoric acid mixtures, mixtures of hexavalent and trivalent chromium, as well as completely trivalent chromium mixtures, also can be utilized. A typical chrome rinse solution can prepared, for example, by dissolving 38.4 grams of chromic acid and 12.9 grams of hydrated line in 48.7 grams of water. The working bath is prepared by adding approximately 1 pint of the solution above to 100 gallons of water.

The chromium rinse solution can be applied to the coated metal surfaces using various techniques including immersion, flooding, spraying, etc. Generally, it is preferred that the aqueous chromium containing rinse solution is maintained at an elevated temperature while it is contacted with the phosphated coated metal surface. Temperatures in the range of from about 30° C. to 100° C. and contact times of up to about 30 seconds or 2 minutes are typical. Following the application of the chromium containing rinse solutions, the treated metal surfaces preferably may again be rinsed with water so as to remove any of the acidic rinse solution which may remain on the surface.

In yet another embodiment, the phosphated articles can be rinsed with dilute aqueous solution of non-chromic acid solutions. The non-chromic acid rinse appears to "seal" the phosphate coating find improve its utility as a base for the application of the sealcoat coating. Examples of non-chromic acid rinses include solutions of borated amines, zirconates, titanates, and fatty acid amine soaps such as alkanol amines.

Non-phosphate Metal-containing Coating

Either an aqueous or an organic liquid vehicle may be used to deposit a non-phosphate metal-containing coating on a metal surface. It is well known in the metal finishing art to provide metal surfaces with a metal-containing coating by contacting them with either an aqueous or an organic solution. For example, contacting is accomplished by techniques such as spraying, brushing, dipping, roller-coating, flow coating and even electrophoretic techniques may be employed. In one embodiment, the non-phosphate metal-containing coating composition contains a liquid medium and metal particles (preferably finely divided metal dust). Although particle size is not critical in certain embodiments, in other embodiments it is preferable that the average particle size is less than 100 microns and more preferably less than 20 microns.

A non-phosphate metal-containg coating may be applied to a treated or untreated surface, so long as the metal surface is not a phosphated metal surface. The metal-containing coating is a non-phosphate, metal coating. If a coating contains phosphate and a metal such as zinc, the coating is considered to be a phosphate coating and not a metal-containing or zinc-containing coating for purposes of this invention. The non-phosphate metal-containing coating can provide corrosion protection, substrate weldability, a base coat for subsequent treatments, adhesion promotion for subsequent coatings and thixotropic properties. The non-phosphate metal-containing coating is preferably applied to treated or untreated non-phosphated metal surfaces prior to application of an additional organic film and/or the sealcoat.

In one embodiment, the "metal" of the non-phosphated metal-containing coating, for purposes of this invention, includes any non-phosphate metal or metal oxide capable of existing in particulate, flake or powder form. Examples include aluminum, cadmium, calcium, carbon, cesium, chrome, chromium, cobalt, copper, gold, indium, iridium, iron, lead, magnesium, magnetite, manganese, molybdenum, nickel, palladium, platinum, potassium, scandium, selenium, silicon, silver, sodium, steel, strontium, sulfur, tantallum, tin, titanium, tungsten, vanadium, zinc, zirconium and oxides, alloys and mixtures thereof. Preferred examples include aluminum, chrome, chromium, iron, manganese, steel, tin, zinc, and oxides, alloys and mixtures thereof. A preferred mixture is an aluminum-zinc mixture. An aluminum-zinc mixture can suppress "red brust" corrosion.

The liquid vehicle of the non-phosphate metal-containing coating compositions may be based upon any known metal-containing coating compositions in the art including: chromic acid and water compositions (preferably with a wetting agent); ammonium dichromate compositions; water and tertiary butyl alcohol compositions; water-dispersible organic liquidand thickening agent compositions; organic ammonium silicate aqueous compositions; and other resin-free solutions.

The liquid vehicle may also be a resinous film-forming binder such as an epoxy resin metal-containing coating composition, an alkyd resin metal-containing coating composition and additionally liquid vehicles based chlorinated hydrocarbons, tertiary alcohol and ether alcohols other than tertiary butyl alcohol; polystyrene; chlorinated or isomerized rubbers; polyvinyl acetate and polyvinylchloridepolyvinylacetate copolymers; alkyd/melamine; and epoxy resins. When applying a non-phosphate metal-containing coating electrophoretically, it is preferable to use water-soluble or dispersable resins as a binder in an aqueous medium.

When the metal is in powder, particulate, or flake form, preferably, all particles should be less than 100 mesh and preferably less than about 325 mesh (U.S. Standard Sieve Series). The metal can be applied dry or as a component in a dispersion, resin, or other liquid. Examples of dry application include brushing, blasting and electrostatic spraying.

The non-phosphate metal containing coating compositions may be applied to the treated or untreated metal surface using any method for coating a treated or untreated metal surface with a liquid. For example, dip coating, roller coating, curtain coating, airless, praying, rotary brush coating, pressure spray, electrophoretic methods and any other method described in the Sealcoat or Additional Organic Film sections. The dispersions, resins or liquid compositions containing metal may or may not contain hexavalent chromium containing components, such as chromium trioxide or chromic acid anhydride. As the liquid vehicle, water and organic liquids are preferred. The dispersions, resins and liquids discussed in the sealcoat section may also be used to apply a metal coating to a treated or untreated metal surface. When a dispersion, resin or liquid metal-containing composition is used, the liquid vehicle should contain about 1,000 grams of metal per liter of vehicle. Water and t-butanol are preferred liquid vehicles. Such resins include phenolic modified and maleic modified alkyd resins, glycerol isophthalate resins, phenolic or maleic modified resins, epoxy resins, glyptal resins, gums and dammar gums, polyester resins, polybutene resins, polyurethanes, hydrocarbon resins such as methylated paraffinic hydrocarbons, polydiene, polyterpene, polyethylene and polypropylene resins, or mixtures or one or more thereof.

In another embodiment, the non-phosphate metal-containing coating may be a non-chrome based conversion coating such as a titanium or zirconium based conversion coating. Such coatings are preferably applied prior to application of an additional organic film and the sealcoat.

In another embodiment, the non-phosphate metal-containing coated articles can be rinsed with a hot dilute aqueous solution of chromic acid containing trivalent or hexavalent chromium calculated as $CrO_3$, typically in an amount within the range of from about 0.01 to about 1% by weight of the solution. The chromic acid rinse may serve to "seal" the metal-containing coating and improve its utility as a base for the application of the sealcoat. Various water-soluble or water-dispersible sources of hexavalent chromium may be used in formulating the rinsing solution, provided the anions and the cations introduced with the hexavalent chromium do not have a detrimental effect on either the solution itself or the coated surfaces. Specific chromic acid rinses are described in the Phosphate Coating section.

Various additives can be added to the non-phosphate metal-containing coating compositions including those additives previously mentioned in the Sealcoat section. Nevertheless, additives for the non-phosphate metal-containg coating compositions include binders, pigments, thickening agent gelling agents, surface active agents, dispersing agents, suspending agents, defoaming agents, wetting agents, adhesion promoters, other metal particulates, thixotropic agents and anti-settling agents.

Before applying the non-phosphate metal-containing coating to a treated or untreated metal surface, it is preferable to remove foreign matter from the treated or untreated metal surface by thoroughly cleaning and degreasing. Degreasing may be accomplished with known agents, for instance, with agents containing sodium metasilicate, caustic soda, carbon tetrachloride, trichloroethylene and the like. Commercial alkaline cleaning compositions which combine washing and mild abrasive treatments can also be employed. In addition to cleaning, etching, for example with a hydrofluoric acid etching agent, may also be employed. Other cleaning solutions are described in the phosphate coating section.

The preparation and use of non-phosphate metal-containing coatings and metal-containing coating compositions is well known in the metal finishing art as shown by U.S. Pat. Nos. 3,110,691; 3,118,048; 3,372,038; 3,469,071; 3,671,331; 3,687,738; 3,687,73; and 3,849,141. The disclosures of these patents, including any patents cited therein, regarding metal-containing coatings and the procedures for applying such coatings are hereby incorporated by reference.

In view of the extensive commercial development of the metal-containing coating and the many journal publications and patents describing the preparation and application of metal-containing solutions, it is believed unnecessary to lengthen the specification unduly by a detailed recitation of the many ways in which the application of metal-containing coatings can be accomplished.

The methods of the present invention involve applying one or more coatings or films to a treated or untreated metal surface and curing one or more of the coatings or films. Numerous embodiments methods are envisioned by the present invention. The following examples 10–23 illustrate these methods, though other embodiments in addition to examples 10–23 exist.

Example 10

Screws and bolts made of metal, such as aluminum-zinc, are optionally cleaned. The screws and bolts are not subjected to a phosphating treatment. The screws and bolts are immersed in the sealcoat composition of Example 1 and then baked in an oven at 150° C. for 30 minutes thereby curing the sealcoat.

Example 11

The procedure for Example 10 is followed except that an antioxidant compound, such as itaconic acid-acrylonitrile copolymer, is added to the sealcoat composition of Example 1.

Example 12

The procedure for Example 10 is followed except that an antioxidant coating is applied after immersion in the sealcoat composition. The coatings are then simultaneously cured in the oven.

Example 13

The procedure for Example 10 is followed except that an antioxidant coating is applied after curing the sealcoat. The screws band bolts having the antioxidant coating is then baked in an oven at 120° C. for 20 minutes thereby curing the antioxidant coating.

Example 14

The procedure for any of Examples 10–13 is followed except that an additional organic film according to Example 7 is applied electrophoretically before immersion in the sealcoat composition. The additional organic film and the sealcoat are then simultaneously cured in the oven.

Example 15

The procedure for Example 10 is followed except that an additional organic film according to Example 8 is applied after curing the sealcoat composition. The screws and bolts having the additional organic film is then baked in an oven at 120° C. for 20 minutes thereby curing the additional organic film.

Example 16

Nuts made of metal, such as chrome-zinc, are optionally cleaned. The nuts are subjected to a phosphating treatment. The nuts are sprayed with the sealcoat composition of Example 2 and then baked in an oven at 190° C. for 10 minutes thereby curing the sealcoat.

Example 17

The procedure for Example 16 is followed except that an antioxidant compound, such as hydroxy phosphono acetic acid, is added to the sealcoat composition of Example 2.

Example 18

Screws and bolts made of metal, such as aluminum-chrome-zinc, are optionally cleaned. The screws and bolts are not subjected to a phosphating treatment. A metal-containing coating, such as an aluminum-zinc containing coating, is applied to the non-phosphated screws and bolts. The screws and bolts are dipped in the sealcoat composition of Example 3 and then baked in an oven at 170° C. for 40 minutes thereby curing the sealcoat.

Example 19

The procedure for Example 18 is followed except that an antioxidant compound, such as itaconic acid-acrylonitrile copolymer, is added to the sealcoat composition of Example 3.

Example 20

The procedure for Example 18 is followed except that an antioxidant coating is applied after dipping in the sealcoat composition. The coatings are then simultaneously cured in the oven.

Example 21

The procedure for Example 18 is followed except that an antioxidant coating is applied after curing the sealcoat. The screws and bolts having the antioxidant coating is then baked in an oven at 110° C. for 50 minutes thereby curing the antioxidant coating.

Example 22

The procedure for any one of Examples 18–21 is followed except that an additional organic film according to Example 9 is applied electrophoretically before dipping in the sealcoat composition. The additional organic film and the sealcoat are then simultaneously cured in the oven.

Example 23

The procedure for Example 18 is followed except that an additional organic film according to Example 8 is applied after curing the sealcoat composition. The screws and bolts having the additional organic film is then baked in an oven at 140° C. for 400 minutes thereby curing the additional organic film.

The processes of the present invention lead to improvements in the driveability, torque properties and corrosion-inhibiting properties of treated or untreated metal surfaces. Moreover, using the sealcoat of the present invention eliminates the need to provide metal surfaces with an oil film or top coat of an oil based composition. Such an oil film or top coat typically contains kerosene, fuel oil, gas oil, petroleum based oils such as paraffinic oil and cycloparaffinic oils (naphthenic oils), mineral oils, castor oil, olive oil, sesame seed oil, dioctyl adipate or dinonyl sebacate. The metal articles treated according to the present invention, in one embodiment, are characterized by the absence of an oil film or top coat of an oil based composition.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A method of producing a torque modifying coating on a non-phosphated metal surface comprising the steps:
   (A) coating the non-phosphated metal surface with a film-forming sealcoat comprising at least one organic resin and at least one torque modifier, wherein the torque modifier is at least one of fluoroalkene polymers, polyethylene, polypropylene and mica in at least one of particle and powder form; and
   (B) curing the film-forming sealcoat.

2. The method of producing a torque modifying coating on a non-phosphated metal surface according to claim 1, further comprising the steps:
   (C) electrophoretically applying an additional organic film before or after coating the non-phosphated metal surface with the film-forming sealcoat; and
   (D) curing the additional organic film.

3. The method of producing a torque modifying coating on a non-phosphated metal surface according to claim 1, wherein the torque modifier is selected from the group consisting of fluoroalkene polymers, polyethylene, and polypropylene.

4. The method of producing a torque modifying coating on a non-phosphated metal surface according to claim 1, wherein the organic resin is selected from the group consisting of urethane resins, amino resins, acrylic resins, alkyd resins, epoxy resins, phenolic resins, cyclized olefin rubbers and mixtures thereof.

5. The method of producing a torque modifying coating on a non-phosphated metal surface according to claim 1, wherein the sealcoat further comprises an antioxidant compound.

6. The method of producing a torque modifying coating on a non-phosphated metal surface according to claim 1, wherein the torque modifier comprises at least two selected from the group consisting of fluoroalkene polymers, polyethylene, polypropylene, and mica.

7. The method of producing a torque modifying coating on a non-phosphated metal surface according to claim 2, wherein the additional organic film is applied before coating the non-phosphated metal surface with the film-forming sealcoat, and both the sealcoat and the additional organic film are cured at the same time.

8. The method of producing a torque modifying coating on a non-phosphated metal surface according to claim 1, further comprising the steps of (C) applying an antioxidant coating before or after coating the non-phosphated metal surface with the film-forming sealcoat;

(D) curing the antioxidant coating.

9. The method of producing a torque modifying coating on a non-phosphated metal surface according to claim 8, wherein the antioxidant coating is applied after coating the non-phosphated metal surface with a film-forming sealcoat.

10. The method of producing a torque modifying coating on a non-phosphated metal surface according to claim 1, wherein the sealcoat further comprises at least one of talc and calcium carbonate.

11. A method of producing a torque modifying coating on a non-phosphated metal surface comprising the steps:

(A) coating the non-phosphated metal surface with a film-forming sealcoat comprising at least one organic resin and at least one torque modifier, wherein the torque modifier is at least one of fluoroalkene polymers, polyethylene, polypropylene and mica in at least one of particle and powder form;

(B) curing the film-forming sealcoat;

(C) applying at least one of an electrophoretic additional organic film and an antioxidant film before or after coating the non-phosphated metal surface with the film-forming sealcoat; and (D) curing the film of step (C).

12. The method of producing a torque modifying coating on a non-phosphated metal surface according to claim 11, wherein the torque modifier is selected from the group consisting of fluoroalkene polymers, polyethylene, and polypropylene.

13. The method of producing a torque modifying coating on a non-phosphated metal surface according to claim 11, wherein the torque modifier comprises a mixture of polytetrafluoroethylene and polyethylene.

14. The method of producing a torque modifying coating on a non-phosphated metal surface according to claim 11, wherein the sealcoat further comprises an antioxidant compound.

15. The method of producing a torque modifying coating on a non-phosphated metal surface according to claim 11, wherein the sealcoat further comprises at least one of talc and calcium carbonate.

16. A method of treating a non-phosphated metal surface comprising the steps:

(A) coating the non-phosphated metal surface with a film-forming sealcoat comprising at least one organic resin and at least one torque modifier, wherein the torque modifier is at least one of fluoroalkene polymers, polyethylene, polypropylene and mica in at least one of particle and powder form and the organic resin is at least one of epoxy resins, amino resins, urethane resins, acrylic resins, alkyd resins and phenolic resins; and (B) curing the film-forming sealcoat.

17. The method of treating a non-phosphated metal surface according to claim 16, wherein the torque modifier is selected from the group consisting of fluoroalkene polymers, polyethylene, and polypropylene.

18. The method of treating a non-phosphated metal surface according to claim 16, wherein the torque modifier comprises a mixture of polytetrafluoroethylene and polyethylene.

19. The method of treating a non-phosphated metal surface according to claim 16, wherein the sealcoat further comprises an antioxidant compound.

20. The method of treating a non-phosphated metal surface according to claim 16, wherein the sealcoat further comprises at least one talc and calcium carbonate.

* * * * *